US007182219B2

(12) United States Patent
Chang

(10) Patent No.: US 7,182,219 B2
(45) Date of Patent: Feb. 27, 2007

(54) VENDING MACHINE FOR DISPENSING ITEMS IN SMALL PACKAGES

(76) Inventor: Kil Jae Chang, T.PiCO. Korea Manufacturing, 321-37 Suksu, 2 Dong, Anyang City, Kyungdido (KR)

(*) Notice: Subject to any disclaimer, the term of this patent is extended or adjusted under 35 U.S.C. 154(b) by 463 days.

(21) Appl. No.: 10/683,687

(22) Filed: Oct. 10, 2003

(65) Prior Publication Data

US 2005/0077311 A1 Apr. 14, 2005

(51) Int. Cl.

*B65H 1/00* (2006.01)
*B65H 3/00* (2006.01)
*G07F 11/10* (2006.01)
*G07F 11/16* (2006.01)
*B65G 59/00* (2006.01)

(52) U.S. Cl. ...................... 221/133; 221/152; 221/154; 221/122

(58) Field of Classification Search ................ 221/133, 221/119, 121, 122, 123, 152, 154, 155, 266, 221/277, 24, 76, 151; 312/97.1, 42
See application file for complete search history.

(56) References Cited

U.S. PATENT DOCUMENTS 690,068 A 12/1901 Mills
844,843 A 2/1907 Anthony
1,072,758 A * 9/1913 Miller ..................... 222/129.1
1,084,563 A * 1/1914 Schroeder ................... 221/113
1,121,804 A * 12/1914 Coulson ...................... 221/93
1,347,558 A * 7/1920 Simon ........................ 221/121
1,426,844 A 8/1922 Wood
1,546,077 A 7/1925 Hunter et al.
1,697,510 A * 1/1929 Morin ......................... 221/20
1,723,497 A * 8/1929 Zucchelli .................... 221/113
2,013,901 A * 9/1935 Shankland .................. 221/132
2,099,267 A * 11/1937 Hackett ....................... 221/17
2,268,688 A * 1/1942 Andrews .................... 221/119
2,512,183 A * 6/1950 Stewart ......................... 221/6
2,529,222 A * 11/1950 Makibbin ................... 221/122
2,696,324 A * 12/1954 Jones .......................... 221/20
2,772,811 A * 12/1956 Schaef ....................... 221/155
2,865,532 A * 12/1958 Smith .......................... 221/13
2,876,928 A * 3/1959 Adams et al. ............. 221/122
2,880,906 A * 4/1959 Probasco .................... 221/203
2,986,019 A * 5/1961 Happer ........................ 62/250
2,990,084 A * 6/1961 Probasco .................... 221/122
3,018,148 A * 1/1962 Probasco ..................... 312/35
3,036,732 A 5/1962 Schaef ....................... 221/113
3,680,736 A * 8/1972 Viessmann ................... 221/14
3,797,701 A * 3/1974 Allocco et al. ............. 221/155
4,109,825 A * 8/1978 Weitzman .................... 221/14

(Continued)

*Primary Examiner*—Gene O. Crawford
*Assistant Examiner*—Rakesh Kumar
(74) *Attorney, Agent, or Firm*—John R. Flanagan

(57) ABSTRACT

A coin-operated vending machine includes a magazine which stores small boxes or packages of items one on top of the next in columns or stacks arranged in a circumferential row thereof and a dispensing mechanism operable to effectively dispenses such small boxes or packages of items one at a time from a selected one of the stacks thereof. The vending machine also includes a one-way indexing mechanism operatively adapted to limit rotation movement of the magazine to only one rotational direction and a reciprocal locking mechanism capable of coacting with the dispensing mechanism to lock the magazine in a stationary position when a lowermost package is received in the dispensing mechanism from the selected one of the stacks.

12 Claims, 7 Drawing Sheets

U.S. PATENT DOCUMENTS 4,126,366 A * 11/1978 Handler et al. .......... 312/249.2
4,150,766 A * 4/1979 Westendorf et al. ........ 221/112
4,258,966 A * 3/1981 Grubb, Jr. ................... 312/305
4,663,943 A * 5/1987 Dyment et al. ............... 62/250
4,848,856 A * 7/1989 Dyment et al. ............. 312/135
5,090,783 A * 2/1992 Chimner .................... 312/9.46
5,277,330 A * 1/1994 Saussier ........................ 221/5
6,068,158 A * 5/2000 Chabout ..................... 221/113
6,247,611 B1 * 6/2001 Clements et al. ........... 221/277
6,378,724 B1 * 4/2002 Chang ......................... 221/24

* cited by examiner

VENDING MACHINE FOR DISPENSING ITEMS IN SMALL PACKAGES

BACKGROUND OF THE INVENTION

1. Field of the Invention

The present invention generally relates to coin-operated vending machines and, more particularly, is concerned with a coin-operated vending machine adapted particularly to dispense items in small boxes or packages.

2. Description of the Prior Art

Coin-operated vending machines for dispensing various items of various types and shapes have been popular for many years. One category of vending machine, commonly referred to as a gum ball machine, is adapted for dispensing items in the form of round pieces of candy. This category of vending machine has been a favorite type over the years. Another category of vending machines is one for dispensing lollipops and the like. Still another category of vending machine is one capable of dispensing items in small rectangular packages or boxes are also known.

Some examples of the latter category of vending machine are the ones disclosed in U.S. Pat. No. 690,068 to Mills, U.S. Pat. No. 844,843 to Anthony, U.S. Pat. No. 1,072,758 to Miller, U.S. Pat. No. 1,084,563 to Schroeder, U.S. Pat. No. 1,426,844 to Wood, U.S. Pat. No. 1,546,077 to Hunter et al., U.S. Pat. No. 1,697,510 to Morin, U.S. Pat. Nos. 2,772,811 and 3,036,732 to Schaef and U.S. Pat. No. 4,109,825 to Weitzman. Many of the vending machines of these prior art patents appear to be satisfactory in use for the specific purposes for which they were designed.

However, it has been perceived by the inventor herein that a need still exists for a coin-operated vending machine that will operate effectively to store and dispense items in small boxes or packages thereof.

SUMMARY OF THE INVENTION

The present invention provides a vending machine designed to satisfy the aforementioned need. The vending machine of the present invention effectively stores small boxes or packages of items one on top of the next in a plurality of columns or stacks arranged in a circumferential row thereof and then effectively dispenses such small boxes or packages of items one at a time from a selected one of the stacks thereof.

Accordingly, the present invention is directed to a vending machine which comprises: (a) an upstanding base housing defining a hollow interior chamber; (b) a top platform mounted on the base housing and having a central opening defined therein and a radial opening also defined therein extending radially outward of and spaced from the central opening; (c) a storage magazine mounted above the top platform and the base housing and having an outer annular row of vertical cavities for receiving and holding in stacked fashion small packages of items to be dispensed from the machine one at a time from a lower opening of a selected one of the vertical cavities; (d) an outer enclosure mounted on the top platform and surrounding the storage magazine and adapted to be manually rotated by a user; (e) a top cover removably mounted on an upper end of the outer enclosure so as to overlie and close upper openings of the vertical cavities of the magazine and interfit with the outer enclosure such that the top cover will rotate with the outer enclosure when the outer enclosure is manually rotated by a user; (f) a coupling subassembly disposed centrally through the magazine and through the central opening of the top platform and supported by the top platform from below the top platform and coupling the storage magazine with the top cover and rotatably mounting the storage magazine and the top cover and outer enclosure therewith as a unit for undergoing rotation relative to the top platform and the base housing for disposing the selected one of the cavities over the radial opening of the top platform; (g) a coin-operated dispensing mechanism mounted on the base housing and disposed in the interior chamber thereof and being operable in response to a coin being deposited therein to enable dispensing of one lowermost package of items at a time from the selected one of the cavities overlying the radial opening in the top platform; and (h) a coin collection station mounted on the base housing and extending into the hollow interior chamber thereof below the coin-operated dispensing mechanism for receiving therefrom the coin deposited therein to cause operation of the dispensing mechanism to dispensed the one lowermost package of items. The vending machine also includes a one-way indexing mechanism operatively adapted to limit rotation movement of the outer enclosure, top cover and magazine as a unit in only one rotational direction. The vending machine further includes a reciprocal locking mechanism capable of coacting with the dispensing mechanism to lock the magazine in a stationary position when a lowermost package is received in the dispensing mechanism from the selected one of the cavities.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
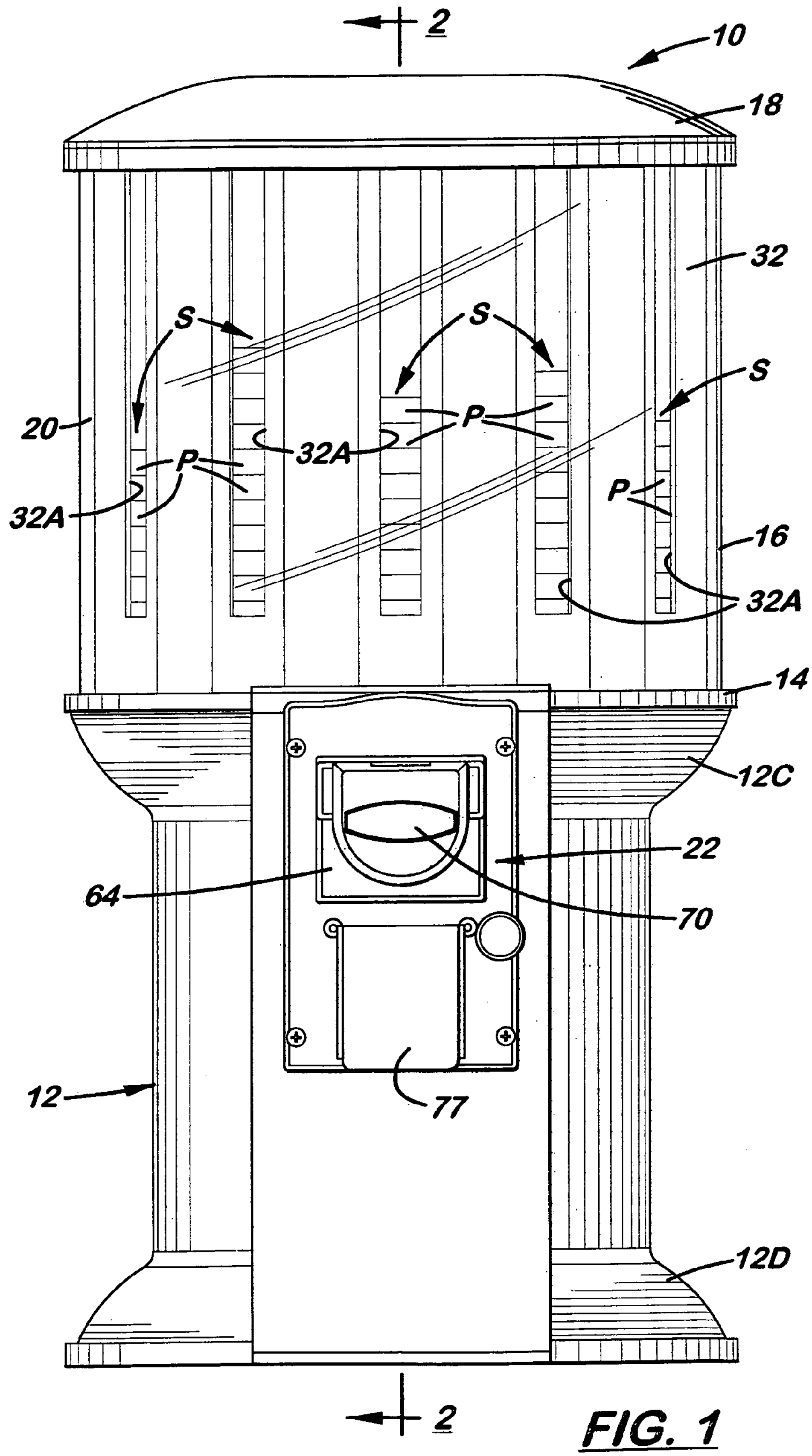
FIG. 1 is a front elevational view of a coin-operated vending machine of the present invention for dispensing items in small boxes or packages.

Referring to the drawings and particularly to FIGS. 1 to 4, there is illustrated a coin-operated vending machine, generally designated 10, of the present invention for dispensing items in small boxes or packages P. Basically, the vending machine 10 includes a base housing 12, a top platform 14, an outer enclosure 16, a top cover 18, a storage magazine 20, a coin-operated dispensing mechanism 22, a one-way indexing mechanism 24, a reciprocal locking mechanism 26, and a coin collection station 28.

The base housing 12 of the machine 10 has a generally cylindrical configuration and is made of a rigid material, such as a suitable plastic. The base housing 12 has upper and lower portions 12A, 12B and defines a hollow interior chamber 30 extending through both upper and lower portions 12A, 12B. The upper portion 12A of the base housing 12 has an annular top rim 12C which flares outwardly and upwardly therefrom. The lower portion 12B of the base housing 12 has an annular bottom rim 12D which flares outwardly and downwardly therefrom to provide upstanding stability of the base housing 12 on a support surface (not shown).

The top platform 14 of the machine 10 has a generally circular configuration and is made of a rigid material, such as a suitable plastic. The top platform 14 is mounted upon the base housing 12, such as by being fastened upon its annular top rim 12C, overlying and substantially closing an open top 30A of the hollow interior chamber 30 of the base housing 12. The top platform 14 has a central opening 14A of circular configuration defined therein and a radial opening 14B of rectangular configuration defined therein. The central opening 14A is smaller in size than the radial opening 14B. The central opening 14A, being located centrally in the top platform 14, surrounds a central axis A running vertically through the base housing 12. The large radial opening 14B extends radially outward from one side of and is spaced from the central opening 14A.

The outer enclosure 16 of the machine 10 has a generally cylindrical configuration and is made of a rigid transparent material, such as a suitable plastic. The outer enclosure 16 rests upon the top platform 14 adjacent to an outer periphery 14C thereof such that the central opening 14A and radial opening 14B of the top platform 14 are located below the interior 16A of the outer enclosure 16. The outer enclosure 16 can be rotatably moved on the top platform 14 by a user gripping the outer enclosure 16 at its opposite sides. The top cover 18 of the machine 10 is removably mounted upon the outer enclosure 16 by being interfitted over and with an upper end 16A of the outer enclosure 16 so as to seat on and in registry with the upper end 16A of the outer enclosure 16 such that the top cover 18 and outer enclosure 16 are rotatable together by a user relative to the top platform 14 and base 12.

Figure 2:
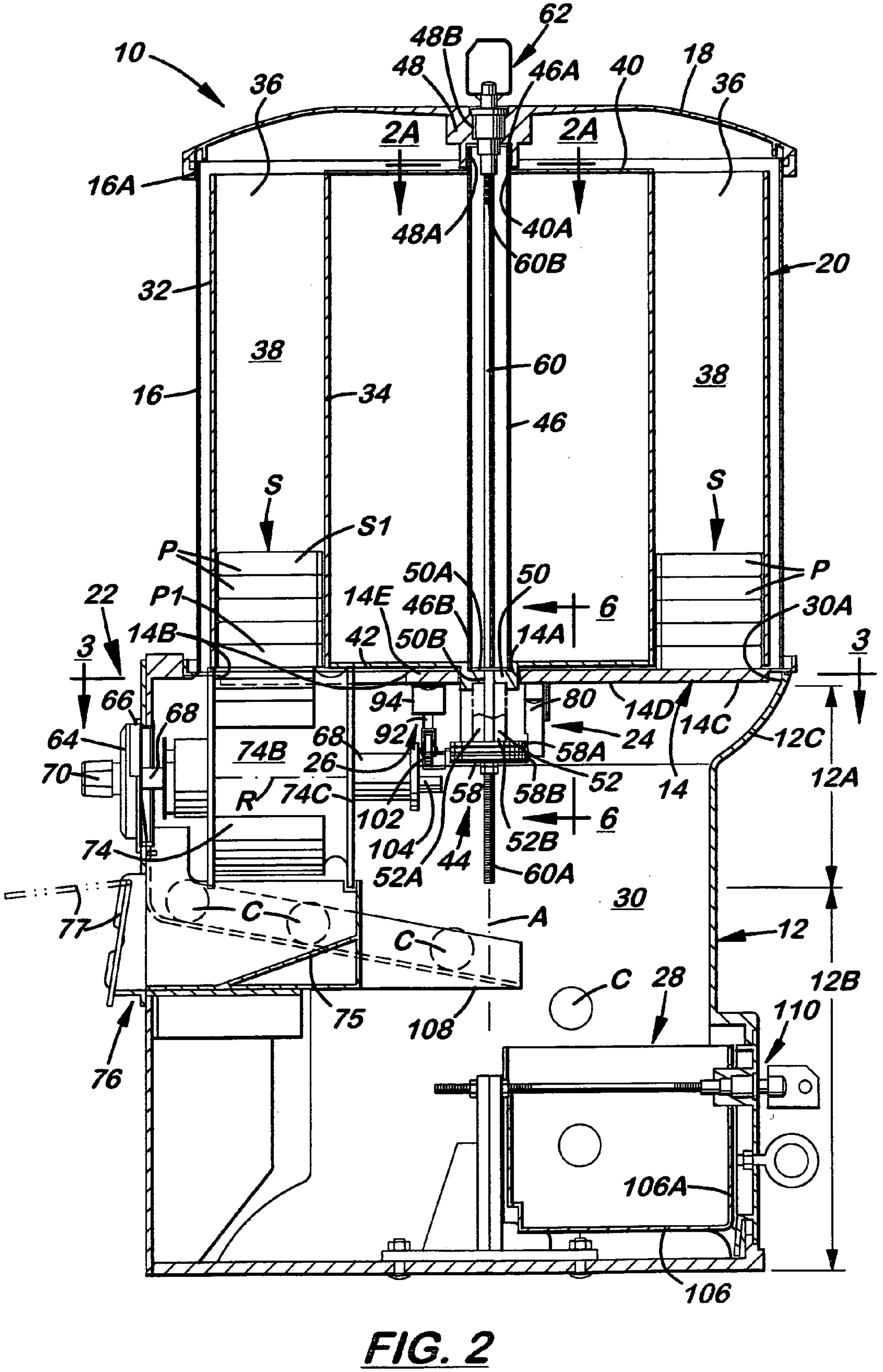
FIG. 2 is a vertical sectional view of the machine taken along line 2—2 of FIG. 1 showing an upstanding base housing, a top platform on the base housing, a product storage magazine rotatably mounted above the top platform, an outer enclosure rotatably mounted on the top platform and surrounding the storage magazine, a top cover interfitted over the outer enclosure and attached to the top of the storage magazine such that the magazine, top cover and outer enclosure are rotatable together relative to the top platform and base housing, a coin-operated dispensing mechanism mounted on an upper portion of the base housing and operable to dispense product items in small boxes thereof from the bottom of a selected one of a plurality of columns thereof in the storage magazine, and a coin collection station mounted on a lower portion of the base housing.
Figure 4:
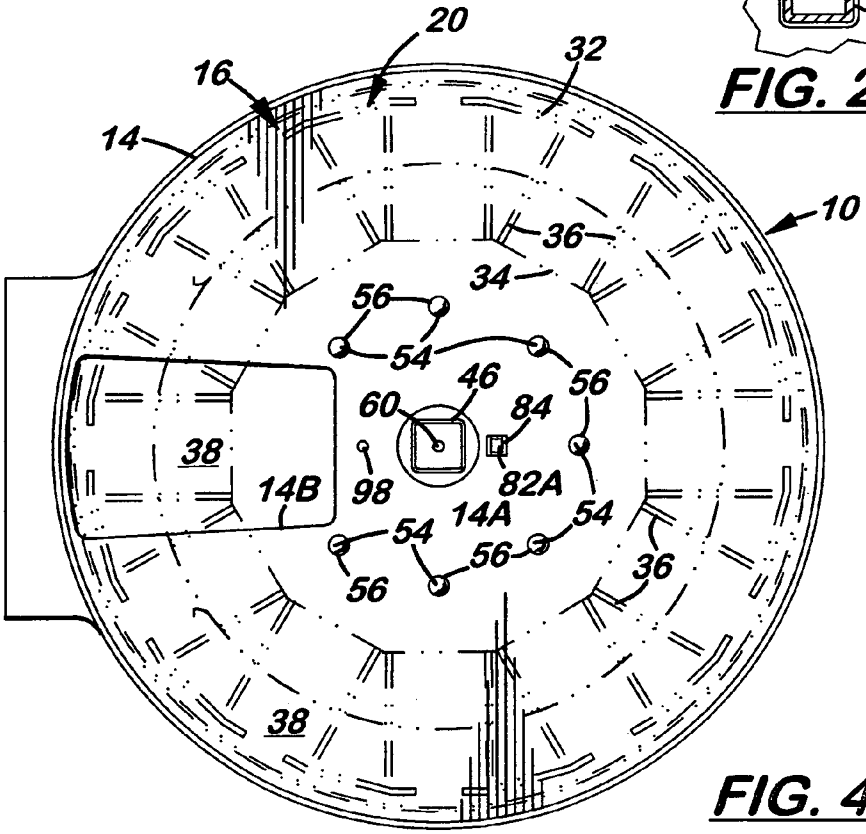
FIG. 4 is a top plan view of the top platform on the base housing of the machine showing the magazine superimposed in dashed line form above the top platform and a central rod and a circular arrangement of ball bearings seated on a top side of the top platform and movably engaged with and supporting a bottom panel of the storage magazine so as to rotatably mount the magazine on the top platform of the base housing.

The storage magazine 20 of the machine 10 has an overall generally cylindrical configuration and is made of a rigid material, such as a suitable plastic. The storage magazine 20 is mounted above the top platform 14 and is coupled with the top cover 18 for undergoing rotational movement relative to the top platform 14 and base housing 12 with the top cover 18 and outer enclosure 16. The storage magazine 20 includes an outer wall 32 of generally annular configuration, an inner wall 34 of generally annular configuration, and a plurality of partitions 36 disposed between and rigidly attached to the outer and inner walls 32, 34 and extending generally radially outward with respect to a central longitudinal axis B of the storage magazine 22 which is generally coaxial with the central axis A of the base housing 12. Also, the partitions 36 are circumferentially spaced apart from one another so as to form a plurality of elongated vertical cavities 38 in the magazine 20, each cavity 38 being generally rectangular in cross-section. Furthermore, the cavities 38 are spaced apart from one another and arranged in an annular row which circumferentially extends around, above and adjacent to the outer periphery 14C of the top platform 14 and about the central longitudinal axis B of the magazine 20. The cavities 38 are open at their opposite upper and lower ends 38A, 38B for receiving small boxes or packages P through the upper ends 38A and holding the packages P in the form of vertical stacks S therein, resting at the lowermost ones of the packages P (except for one of the stacks S1) upon the top platform 14. As seen in FIGS. 2 and 4, the lowermost package P of one S1 of the stacks S will be aligned over the radial opening 14B of the top platform 14 and will rest upon a component of the dispensing mechanism 22, as will be described hereinafter, which is located directly therebelow for enabling the lowermost package P of the one stack S to be dispensed from the machine 10 one at a time from the lower open ends 38B of the vertical cavities 38. The top cover 18 overlies and closes upper open ends 38A of the cavities 38 of the storage magazine 20. The outer wall 32 of the storage magazine 20 has a plurality of circumferentially-spaced longitudinally-extending openings 32A formed therein, allowing a user to see what items are disposed in the various cavities 38 of the storage magazine 20. The storage magazine 20 also includes top and bottom walls 40, 42 attached about their respectively peripheries to the inner wall 34 of the magazine 20 and spanning opposite ends of the magazine 20 within the perimeters of the inner wall 34 thereof.

Figure 2A:
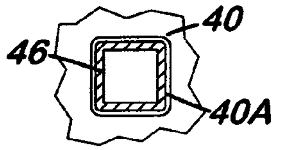
FIG. 2A is a fragmentary sectional view taken along line 2A—2A of FIG. 2.

Referring to FIGS. 2 and 2A, there is shown a coupling subassembly 44 of the machine 10 arranged to rotatably mount the storage magazine 20 and top cover 18 upon the top platform 14 and couple or interconnect the top cover 18 with the storage magazine 20 such that the storage magazine 20, top cover 18 and outer enclosure 16 will rotate together when the outer enclosure 16 is gripped and rotatably moved in one direction by the user about the central axis A of the base housing 12. More particularly, the coupling subassembly 40 includes an elongated hollow rigid tube 46, a collar 48 and a hub 50. The rigid tube 46 has a non-circular, preferably rectangular, cross-sectional configuration as best seen in FIG. 2A. The top wall 40 of the storage magazine 20 has a hole 40A, substantially the same non-circular configuration as the rigid tube 46, centrally defined in the top wall 40. The hole 40A receives therethrough in a closely fitting relationship an upper end portion 46A of the rigid tube 46. The collar 48 is centrally attached to and protrudes downwardly below the top cover 18. The collar 48 has a downwardly open recess or pocket 48A formed therein of substantially the same non-circular cross-sectional configuration as the rigid tube 46. The pocket 48A receives and seats therein the upper end portion 46A of the rigid tube 46. The hub 50 of circular configuration is centrally attached to and protrudes downwardly below the bottom wall 42 of the magazine 20 and extends through the central opening 14A of the top platform 14. Also, the hub 50 forms an upwardly open depression 50A of substantially the same non-circular cross-sectional configuration as the rigid tube 46. The depression 50A receives and seats a lower end portion 46B of the rigid tube 46.

The coupling subassembly 44 further includes a U-shaped bearing support bracket 52, a set of ball bearings 54, circumferentially spaced seats 56 defined in the top platform 14, a bottom bearing ring 58, an elongated rigid rod 60 and a key-operated lock device 62. The bearing support bracket 52 has a pair of legs 52A attached to the bottom surface 14D of the top platform 14 adjacent opposite sides of the central opening 14A therein and extending downwardly from the top platform 14. The ball bearings 54 are respectively disposed in the circumferentially spaced seats 56 recessed in the top surface 14E of the top platform 14 (see FIG. 4) at respective locations radially spaced outwardly from the central opening 14A. The bottom bearing ring 58 is aligned below the circular hub 50 and has an upper bearing component 58A fixedly mounted to a lower bight 52B of the bearing support bracket 52 and a lower bearing component 58B disposed below and rotatably coupled to the upper bearing component 58A. The rigid rod 60 is externally threaded at its opposite lower and upper end portions 60A, 60B. The rigid rod 60 extends through the rigid tube 46, through a hole 50B in the circular hub 50, along the bracket 52 between the opposite legs 52A thereof, and through the bottom bearing ring 58 such that the lower end portion 60A is attached to the lower bearing component 58B of the bottom bearing ring 58 so as to rotate therewith. The key-operated lock device 62 inserts into a bore 48B formed through the central collar 48 on the top cover 18 which opens at the exterior of the top cover 18 and into the pocket 48A of the collar 48. When a key 62A of the key-operated lock device 62 is inserted therein, the lock device 62 can be rotated by the user in opposite directions in order to respectively thread it onto or unthread it from the upper end portion 60B of the rigid rod 60.

When the lock device 62 is rotated in a predetermined one of the opposite directions relative to the upper end portion 60B of the rigid rod 60 and the central collar 48 of the top cover 18, the lock device 62 becomes increasingly threaded and tightened over the upper end portion 60B of the rigid rod 60. When the lock device 62 is sufficiently tightened thereon, it causes clamping of the rigid tube 46 between the central collar 48 of the top cover 18 and the central hub 50 of the bottom wall 42 of the storage magazine 20 such that the top cover 18, the magazine 20 and the lower bearing component 58B function as a single unit rotatably mounted upon the stationary top platform 14 for undergoing rotation about the central axis A of the base housing A and central longitudinal axis B of the magazine 20 by a user gripping the opposite sides of the outer enclosure 16 and turning it in the predetermined one angular or rotational direction as determined by the one-way indexing mechanism 24. Thus, as mentioned earlier, the user is the source of rotary power to manually rotate the storage magazine 20 by gripping opposite sides of the outer enclosure 16 and turning the same which causes rotation of the top cover 18 and storage magazine 20 therewith (due to the outer enclosure 16 being in engaged registry with the top cover 18 which, in turn, is coupled to the storage magazine 20 by the rigid tube 46) relative to the top platform 14 in order to make a selection of products in the stack S thereof in one of the vertical cavities 38 of the magazine 20. As seen in FIG. 4, only the stack S in one of the vertical cavities 38 at a time, as selected by the user turning the magazine 20, will become aligned in communication with the radial opening 14B in the top platform 14. The lower open ends 38B of all of the other cavities 38 are effectively closed by the top platform 14.

Referring to FIGS. 1–3 and 8–10, the coin-operated dispensing mechanism 22 of the machine 10 is shown mounted on the upper portion 12A of the base housing 12 and disposed in the portion of the interior chamber 30 surrounded by the upper portion 12A of the base housing 12. In such position, the dispensing mechanism 22 interfaces with the lowermost one of the boxes or packages P in one S of the columns or stacks S overlying the radial opening 14B in the top platform 14 and is operable to permit dispensing of the lowermost one package P1 in response to each cycle of operation of the dispensing mechanism 22. Each cycle of operation is initiated by depositing a coin C in the dispensing mechanism 22 after which the coin C is transferred to the coin collection station 28 mounted to the lower portion 12B of the base housing 12 and disposed in the interior chamber 30 surround by the lower portion 12B of the base housing 12.

More particularly, the dispensing mechanism 22 includes a front plate 64, a coin slot 66, an elongated shaft 68, a turning knob 70, a one-way ratchet and latch device 72, a cylindrical drum 74, and a product dispensing chute 75. The front plate 64 is fixedly mounted to the upper portion 12A of the base housing 12 and exposed at the exterior thereof. The coin slot 66 is defined in a top edge of the front plate 64. The shaft 68 is rotatably mounted through the front plate 64 and extends into the interior chamber 30 of the base housing 12. The turning knob 70 is fixedly secured to an outer end of the shaft 68 at the exterior side of the front plate 64 such that the knob 70 and shaft 68 will rotate together and the knob 70 is exposed so that it can be grasped and turned by the user in order to rotate the shaft 68. The one-way ratchet and latch device 72 has cooperative components mounted to the front plate 64 at the interior side thereof and to the shaft 68. Its components coact in a well-known manner, first, to always restrict rotation of the shaft 68 to only one angular direction and, second, to normally latch the shaft 68 from undergoing any rotation in the one angular direction until a coin C is deposited in the coin slot 66. Once the coin C is deposited in the coin slot 66, the shaft 68 is unlatched and permitted to be turned or rotated from its initial position, through one cycle or revolution, back to its initial position where it will be automatically relatched by the device 72 against further rotation. The drum 74 is fixedly secured on the shaft 68 and disposed in the interior chamber 30 directly below the radial opening 14B of the top platform 14. The coin slot 66 interfaces in communication with the device 72 such that in response to a coin C being deposited through the coin slot 66 and then received through the device 72, the shaft 68 is permitted to rotate through one cycle or revolution for dispensing the lowermost one P1 of the packages in the stack S1 thereof to the product dispensing chute 76.

Figure 3:
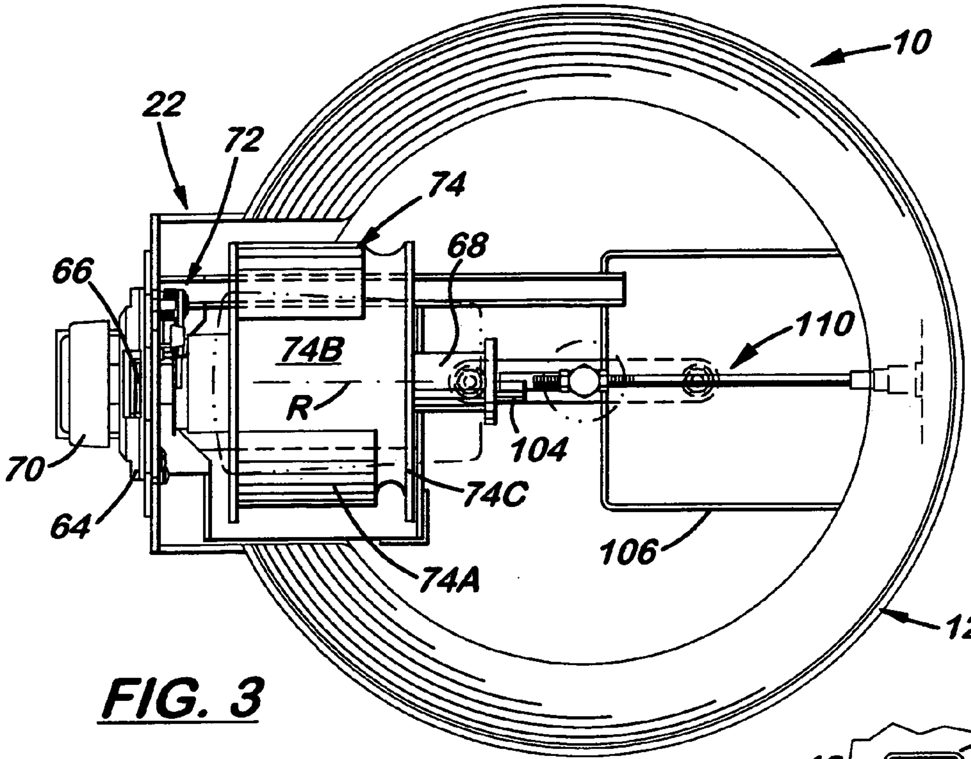
FIG. 3 is a top plan view of the base housing of the machine as seen along line 3—3 of FIG. 2, with the top platform, outer enclosure, top cover and storage magazine of the machine removed from the base housing to expose a hollow interior chamber of the base housing into which extends a cylindrical drum of the dispensing mechanism and a coin box of the coin collection station.
Figure 8:
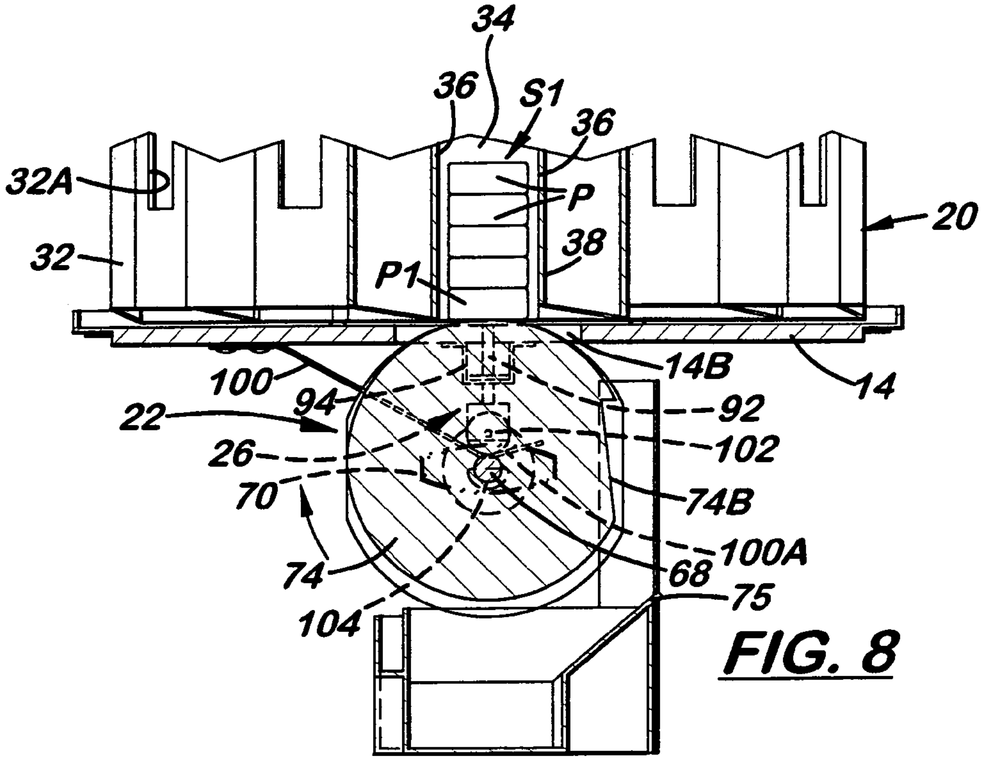
FIG. 8 is an enlarged fragmentary view of a reciprocal locking mechanism of the machine associated with a drum of the dispensing mechanism and with top platform and magazine, showing an elongated locking pin of the locking mechanism in an initial retracted position and a recess on the drum at an initial three o'clock position in one cycle of the dispensing mechanism.

Referring to FIGS. 3 and 8–10, the cylindrical drum 74 is shown having an outer cylindrical surface 74A and a pocket or recess 74B of a reversed L-shaped wedge or notch configuration defined in the outer surface 74A so as to interrupt the continuity of the outer surface 74A. The shaft 68 and drum 74 are initially positioned such that the recess 74B of the drum 74 is located at about a three o'clock angular position, as seen in FIGS. 3 and 8, relative to a rotational axis R defined by the shaft 68. In the initial position of the drum 74, a lowermost one package P1 rests upon the outer surface 74A of the drum 74 at about a twelve o'clock angular position relative to the shaft axis R which position is directly below the radial opening 14B of the top platform 14. In response to a coin C being deposited in the coin slot 66 and then into the one-way ratchet and latch device 72, the device 72 permits the user, by turning the knob 70, to turn the shaft 68 and drum 74 in a clockwise direction, as viewed in FIGS. 8–10, through a single dispensing cycle or revolution in which the initially empty recess 74B is moved from the initial three o'clock position of FIG. 8 to the twelve o'clock position of FIG. 9, where it receives the lowermost one package P1, and finally back to the initial three o'clock position of FIG. 10, where the package P1 will slide and drop away from the recess 74B of the drum 74 down to the product dispensing chute 75 located adjacent to the three o'clock angular position of the recess 74B. The chute 75 extends therefrom to a discharge station 76 located below the drum 74 where a pivotal door 77, as seen in FIGS. 1 and 2, can be swung open by the user at the exterior of the base housing 12 and the package P1 accessed and removed by the user from the machine 10.

Figure 5:
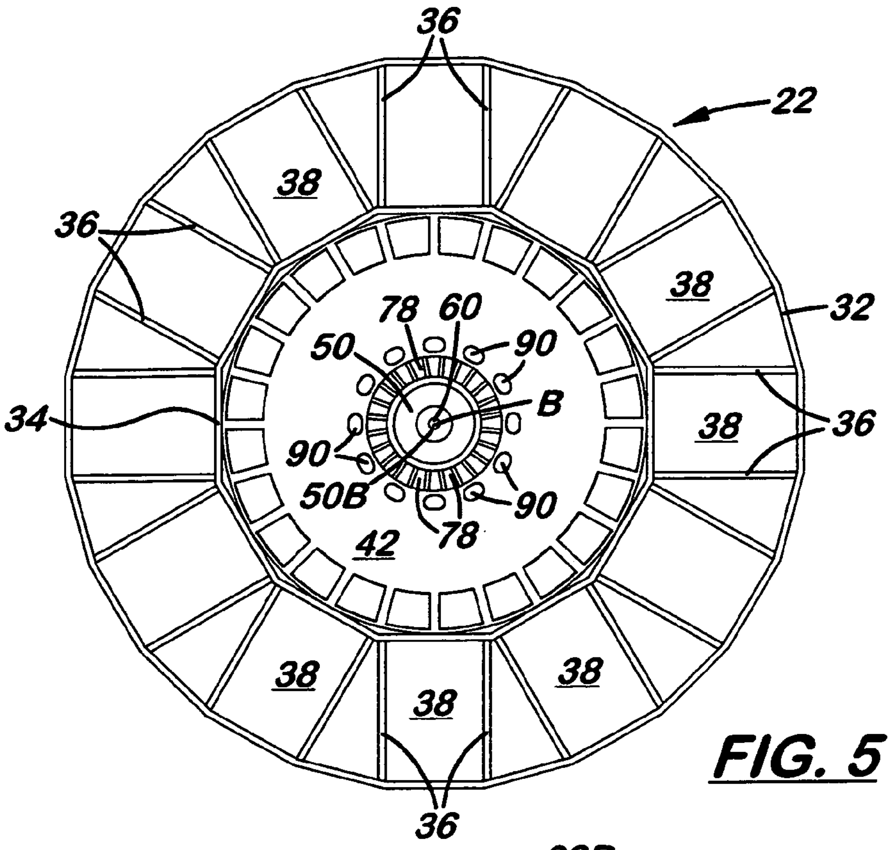
FIG. 5 is a bottom plan view of the storage magazine removed from the machine, showing lower open ends of an outer annular row of vertical cavities of the storage magazine located about and outwardly of a central bottom panel of the storage magazine and a lower inner annular row of one-way teeth of a one-way indexing mechanism disposed in a recess on the bottom side of the bottom wall of the storage magazine extending about a central hub thereon.
Figure 6:
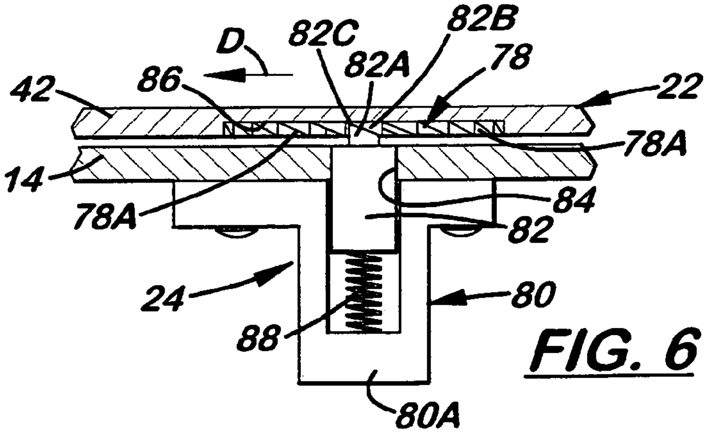
FIG. 6 is an enlarged fragmentary sectional view of the machine taken along line 6—6 of FIG. 2, showing a spring-biased plunger of the one-way indexing mechanism reciprocally mounted at the underside of the top platform and extending upwardly through a hole in the top platform into engaged condition with a given one of the teeth of the one-way indexing mechanism so as to allow manual rotation of the storage magazine and outer enclosure by a user in one rotational direction only and through one of a plurality of incremental small steps rather than as a continuous rotational movement.
Figure 7:
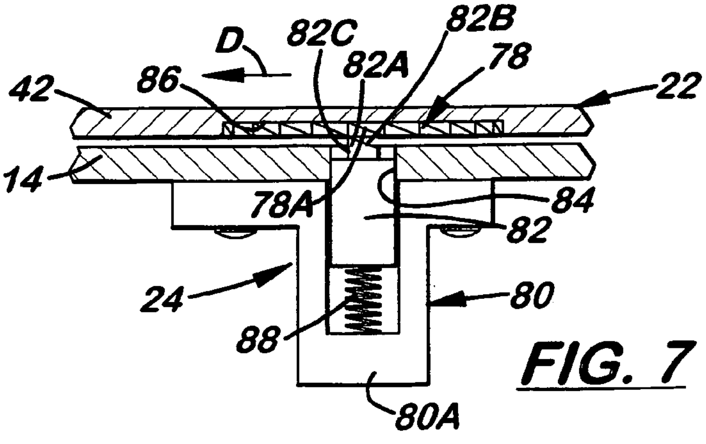
FIG. 7 is a view similar to that of FIG. 6, but now showing the plunger of the one-way indexing mechanism being retracted from engagement with the one of the teeth as the storage magazine and outer enclosure are rotated in the direction of the arrow.

Referring to FIGS. 2 and 4–7, the one-way indexing mechanism 24 of the machine 10 is shown mounted to the bottom surface 14D of the top platform 14 adjacent to and spaced outwardly from one side of the bearing support bracket 52 of the coupling subassembly 44. The one-way indexing mechanism 24 includes a lower inner annular row of one-way teeth 78, a plunger mounting bracket 80, a spring-biased plunger 82, and a hole 84 in the top platform 14. The annular row of one-way teeth 78, as seen in FIGS. 5–7, is seated in a recess 86 defined on the bottom wall 42 of the storage magazine 22 which extends about the circular hub 50 on the bottom wall 42. The plunger mounting bracket 80 is fixedly attached to the bottom surface 14D of the top platform 14 adjacent to and spaced outwardly from one side of the bearing support bracket 52 of the coupling subassembly 44. The plunger 82 is mounted within the plunger mounting bracket 80 for undergoing reciprocal movement within the hole 84 in the top platform 14 and toward and away from the annular row of teeth 78 in the storage magazine 22 such that a top head 82A on the plunger 82 can be correspondingly extended into interengagement with and withdrawn from interengagement with the respective one tooth 78. The top head 82A of the plunger 82 has an inclined top cam surface 82B which forms a pointed offset edge 82C on the top head 82A. As seen in FIG. 6, the top head 82A on the plunger 82 is disposed in an interengaged condition with a given one of the teeth 78 so as to only allow manual rotation of the storage magazine 22 by the user in the direction of an arrow D shown in FIGS. 6 and 7 which extends in the direction of the incline of the top cam surface 82B. The coaction of the inclined top cam surface 82B on the top head 82A of the plunger 82 against the oppositely inclined face 78A of the respective one tooth 78, as the magazine 22 is rotatably moved in the direction of the arrow D, forces the plunger 82 to move downward against the biasing force of a spring 88 away from the top platform 14 and its top head 82A to retract from the hole 84 in the top platform 14. As seen in FIGS. 6 and 7, the spring 88 is captured between the bottom end of the plunger 82 and the bight 80A of the plunger mounting bracket 80. Once the one tooth 78 has passed the top head 82A of the plunger 82, the plunger 82 will then be free to move upward due to the application of the biasing force of the spring 88 thereagainst and thus extend the top head 82A through the hole 84 and into interengagement with the next one of the teeth 78 in the annular row thereof. Thus, the rotational movement by the user of the outer enclosure 16 and the top cover 18 and storage magazine 22 therewith proceeds in only a predetermined one angular or rotational direction and through a plurality of incremental small steps rather than as a continuous rotational movement.

Referring to FIGS. 5 and 8–12, the reciprocal locking mechanism 26 of the machine 10 is shown mounted to the bottom surface 14D of the top platform 14 between the drum 74 of the dispensing mechanism 22 and the bearing support bracket 52 of the coupling subassembly 44 and at a location relative to the bearing support bracket 52 opposite from the location of the one-way indexing mechanism 24. The reciprocal locking mechanism 26 includes an annular row of spaced apart apertures 90, an elongated locking pin 92, a pin mounting bracket 94, a biasing spring 96, a hole 98 in the top platform 14, and a bendable arm 100. The annular row of apertures 90, as seen in FIG. 5, are defined in the bottom wall 42 of the magazine 22 encircling both the annular row of one-way teeth 78 of the one-way indexing mechanism 24 and the circular hub 50 of the magazine 22. The hole 98 in the top platform 14 is spaced from the central opening 14A opposite from the hole 84 of the one-way indexing mechanism 24. The pin mounting bracket 94 is fixedly attached to the bottom surface 14D of the top platform 14 at a location between the drum 74 and bracket 52 and below, and so as to align the locking pin 92 with, the hole 98 in the top platform 14. The locking pin 92 is movably mounted through a bight 94A of the pin mounting bracket 94 such that a lower end portion 92A of the locking pin 92 extends below the bracket 94 and rotatably mounts a roller 102 thereon and an upper end portion 92B of the locking pin 92 extends above the pin mounting bracket 94 and through the hole 100 in the top platform 14 for undergoing reciprocal movement toward and away from a one of the apertures 90 in the storage magazine 22 aligned above the hole 98 in the top platform 14 such that an upper tip end 92C of the locking pin 92 can be correspondingly extended through and retracted from the aligned one of the apertures 90. The bendable arm 100 is mounted to the bottom surface 14D of the top platform 14 such that its free end 100A is disposed below and continuously engaged or in contact with the roller 102 on the lower end portion 92A of the pin 92.

Figure 9:
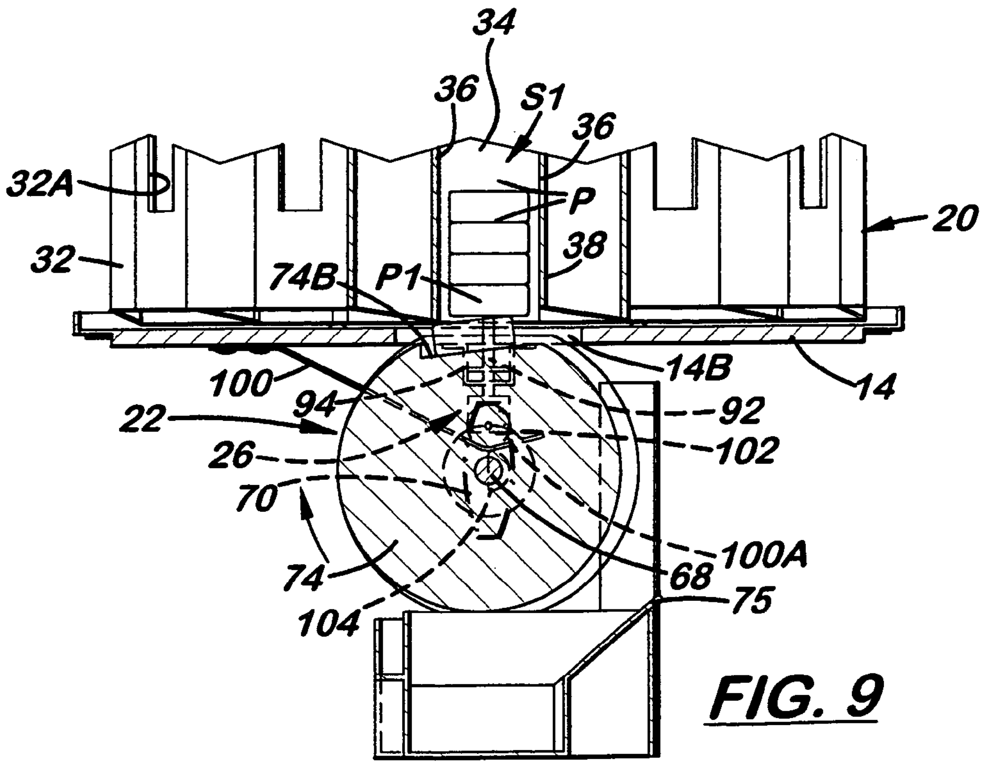
FIG. 9 is a view similar to that of FIG. 8 now showing the locking pin in an extended position and the recess on the drum at an intermediate twelve o'clock position in one cycle of the dispensing mechanism wherein the recess receives a package.
Figure 10:
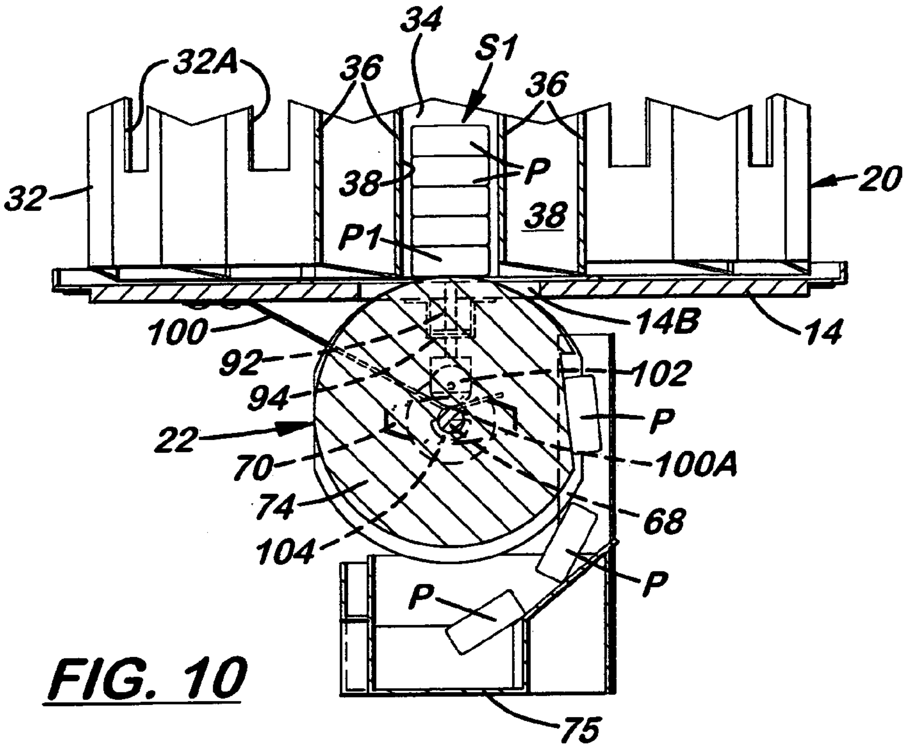
FIG. 10 is a view similar to that of FIG. 8 showing the locking pin back in the retracted position and the recess on the drum back at the three o'clock position wherein the package falls from the recess on the drum.
Figure 11:
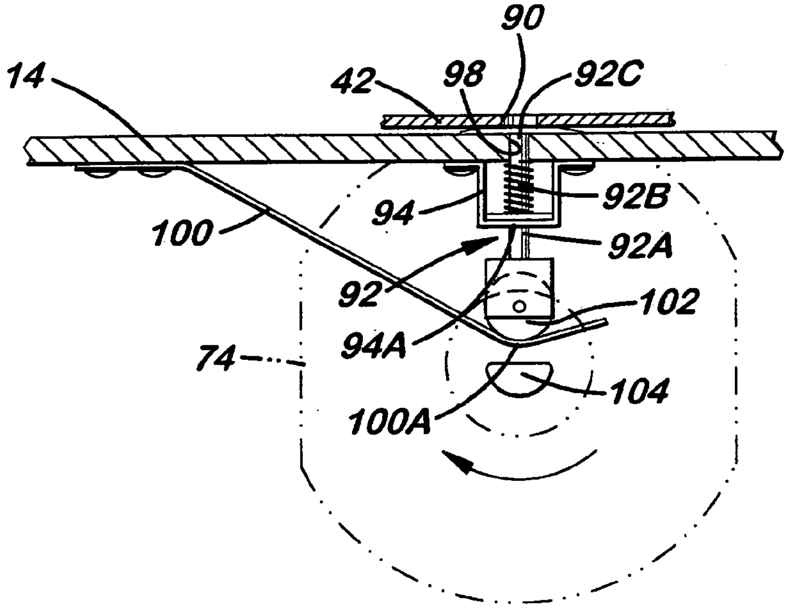
FIG. 11 is a view of the reciprocal locking mechanism positioned as shown in FIG. 8 but now with the drum and magazine being omitted.
Figure 12:
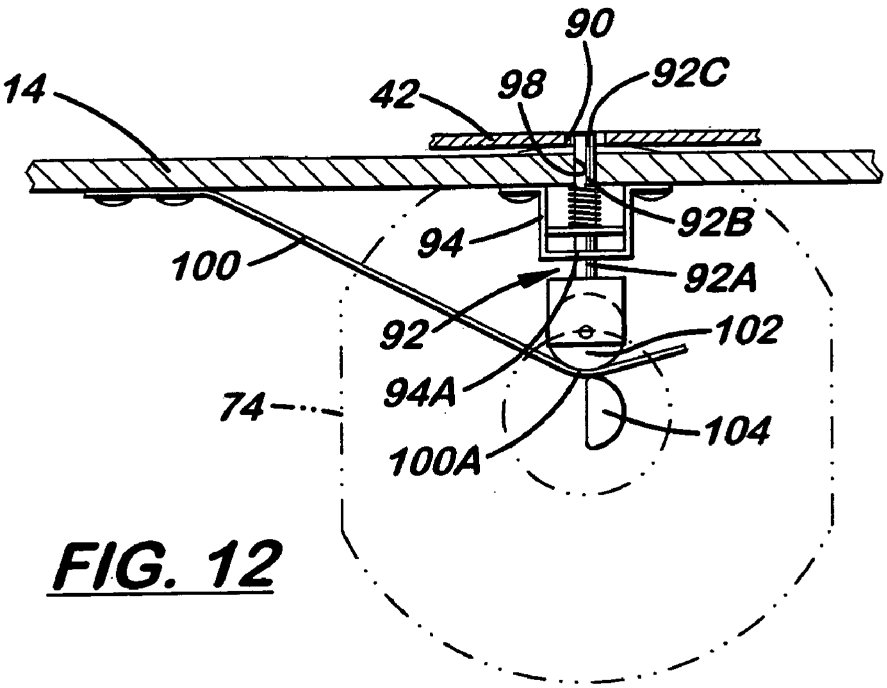
FIG. 12 is a view of the reciprocal locking mechanism similar to that of FIG. 11 but with the locking mechanism positioned as shown in FIG. 9.

Means for actuating the locking pin 92 of the reciprocal locking mechanism 26 to move the locking pin 92 between a raised or extended position, as seen in FIGS. 9 and 12 and a lowered or retracted position, as seen in FIGS. 8, 10 and 11, is an actuating stub shaft 104 fixedly attached to and protruding axially outwardly from an inner end 74C of the cylindrical drum 74 of the dispensing mechanism 22. The actuating stub shaft 104 has a semi-cylindrical cross-sectional configuration and revolves through one revolution about a circular path as the drum 74 rotates through one cycle or revolution of the operation of the dispensing mechanism 22. During the portion of each revolution of the drum 74 wherein the recess 74B is moved clockwise from its initial three o'clock position (FIG. 8 and 10) to the twelve o'clock position (FIG. 9) where the recess 74B is placed directly below the radial opening 14B in the top platform 14 to receive the lowermost one package P1, the stub shaft 104 is revolved and rotated from its initial lower position (FIGS. 8, 10 and 11), wherein it is spaced below the roller 102 (and free end 100A of the bendable arm 100), through an upper position to an upright position (FIGS. 9 and 12), wherein it contact and lifts the locking pin 92 (via bendable arm free end 100A and the roller 102), against the biasing force of the spring 96, to the extended position in which the upper tip end 92C of the locking pin 92 is inserted into the aligned one of the apertures 90 in the magazine 22. Thus, when a selected one of the vertical cavities 38 of the magazine 22 is aligned with the radial opening 14B in the top platform 14 and the recess 74B in the dispensing mechanism drum 74, the raised or extended position of the locking pin 92 prevents the magazine 22 from being further rotated by the user which prevents dispensing of more than one box at a time. Then once the drum 74 is further rotated such that its recess 74B is past the radial opening 14B in the top platform 14, the continued rotation of the actuating stub shaft 104 displaces it below the bendable arm free end 100A and the roller 102 allowing the biasing force of the spring 96 to then retract the upper tip end 92C of the locking pin 92 to below the bottom wall 42 of the magazine 22 such that the magazine 22 is now free to be manually rotated again by a user.

The coin collection station 28 of the machine 10 includes a coin receptacle 106 disposed in the interior chamber 30 of the base housing 12 at the lower portion 12B thereof and a chute 108 which leads from the one-way ratchet and latch device 72 of the dispensing mechanism 22 to above the coin receptacle 106 for transferring the deposited coins C thereto. Another key-operated lock device 110 is operatively associated with the coin receptacle 106 and mounted to an end wall 106A thereof exposed at the exterior of the base housing 12.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A vending machine, comprising:

(a) an upstanding base housing defining a hollow interior chamber;

(b) a top platform mounted on said base housing and having a central opening defined therein and a radial opening also defined therein extending radially outward of and spaced from said central opening;

(c) a storage magazine mounted above said top platform and said base housing and having an outer annular row of vertical cavities for receiving and holding in stacked fashion small packages of items to be dispensed from said machine one at a time from a lower opening of a selected one of said vertical cavities;

(d) an outer enclosure mounted on said top platform and surrounding said storage magazine and adapted to be manually rotated by a user;

(e) a top cover removably mounted on an upper end of said outer enclosure so as to overlie and close upper openings of said vertical cavities of said magazine and interfit with said outer enclosure such that said top cover will rotate with said outer enclosure when said outer enclosure is manually rotated by a user;

(f) a coupling subassembly disposed centrally through said magazine and through said central opening of said top platform and supported by said top platform from below said top platform and coupling said storage magazine with said top cover and rotatably mounting said storage magazine and said top cover and outer enclosure therewith as a unit for undergoing rotation relative to said top platform and said base housing for disposing the selected one of said cavities over said radial opening of said top platform;

(g) a coin-operated dispensing mechanism mounted on said base housing and disposed in the interior chamber thereof and being operable in response to a coin being deposited therein to enable dispensing of one lowermost package of items at a time from the selected one of said cavities overlying said radial opening in said top platform, said coin-operated dispensing mechanism including a rotatable drum disposed in said interior chamber of said base housing below said top platform and having an outer cylindrical surface and a recess defined in said outer surface adapted to receive the one lowermost package through said radial opening of said top platform during rotation of said drum in a predetermined direction through a single dispensing cycle in which said recess, initially empty, is moved from an initial three o'clock position to an intermediate twelve o'clock position where said recess receives the one package, and finally back to said initial three o'clock position, where the package will then drop away from said recess of said drum to a discharge station of said machine;

(h) a coin collection station mounted on said base housing and extending into said hollow interior chamber thereof below said coin-operated dispensing mechanism for receiving therefrom the coin deposited therein to cause operation of saud dispensing mechanism to dispense the one lowermost package of items; and (i) a reciprocal locking mechanism disposed in said interior chamber of said base housing and mounted to a bottom surface of said top platform, said locking mechanism coacting with said rotatable drum of said dispensing mechanism to lock said storage magazine in a stationary position when a lowermost package is received in said dispensing mechanism from the selected one of said cavities.

2. The vending machine of claim 1 wherein said recess defined in said outer surface of said drum is of a reversed L-shaped wedge configuration.

3. The vending machine of claim 1 further comprising:

a one-way indexing mechanism disposed in said interior chamber of said base housing and mounted to a bottom surface of said top platform, said indexing mechanism being capable of coacting through a hole in said top platform and with said storage magazine so as to limit rotation of said storage magazine and said top cover and outer enclosure therewith through a succession of incremental steps relative to said top platform and said base housing.

4. The vending machine of claim 3 wherein said one-way indexing mechanism includes:

an annular row of one-way teeth disposed in a bottom of said storage magazine with one of said teeth at a time being alignable over said hole in said top platform;

a plunger mounting bracket fixedly attached to said bottom surface of said top platform; and a plunger mounted by said plunger mounting bracket for undergoing reciprocal movement within said hole in said top platform and toward and away from said one of said teeth to engage with and disengage from said one of said teeth such that said storage magazine and said top cover and outer enclosure therewith are only allowed to rotatably move through said incremental steps in one predetermined angular direction relative to said top platform.

5. A vending machine, comprising:

(a) an upstanding base housing defining a hollow interior chamber;

(b) a top platform mounted on said base housing and having a central opening defined therein and a radial opening also defined therein extending radially outward of and spaced from said central opening;

(c) a storage magazine mounted above said top platform and said base housing and having an outer annular row of vertical cavities for receiving and holding in stacked fashion small packages of items to be dispensed from said machine one at a time from a lower opening of a selected one of said vertical cavities;

(d) an outer enclosure mounted on said top platform and surrounding said storage magazine and adapted to be manually rotated by a user;

(e) a top cover removably mounted on an upper end of said outer enclosure so as to overlie and close upper openings of said vertical cavities of said storage magazine and interfit with said outer enclosure such that said top cover will rotate with said outer enclosure when said outer enclosure is manually rotated by a user;

(f) a coupling subassembly disposed centrally through said storage magazine and through said central opening of said top platform and supported by said top platform from below said top platform and coupling said storage magazine with said top cover and rotatably mounting said storage magazine and said top cover and outer enclosure therewith as a unit for undergoing rotation relative to said top platform and said base housing for disposing the selected one of said cavities over said radial opening of said top platform;

(g) a coin-operated dispensing mechanism mounted on said base housing and disposed in the interior chamber thereof and being operable in response to a coin being deposited therein to enable dispensing of one lowermost package of items at a time from the selected one of said cavities overlying said radial opening in said top platform;

(h) a coin collection station mounted on said base housing and extending into said hollow interior chamber thereof below said coin-operated dispensing mechanism for receiving therefrom the coin deposited therein to cause operation of said dispensing mechanism to dispense the one lowermost package of items; and (i) a reciprocal locking mechanism disposed in said interior chamber of said base housing and mounted to a bottom surface of said top platform, said locking mechanism coacting with a rotable drum of said dispensing mechanism to lock said storage magazine in a stationary position when a lowermost package is received in said dispensing mechanism from the selected one of said cavities.

6. The vending machine of claim 5 wherein said reciprocal locking mechanism includes:

an annular row of spaced apart apertures defined in a bottom of said storage magazine such that a given one of said apertures at a time is alignable with a hole in said top platform;

a pin mounting bracket fixedly attached to a bottom surface of said top platform in alignment with said hole in said top platform;

an elongated locking pin reciprocally mounted by said pin mounting bracket and extending into said hole in said top platform for undergoing reciprocal movement toward and away from said given one of said apertures in said storage magazine aligned above said hole in said top platform such that said locking pin can be correspondingly extended through and retracted from said aligned one of said apertures for correspondingly locking said storage magazine from undergoing and enabling said storage magazine to undergo rotation relative to said top platform.

7. The vending machine of claim 6 wherein said coin-operated dispensing mechanism includes said rotable drum a disposed in said interior chamber of said base housing below said top platform and rotatable in a predetermined direction through a single dispensing cycle of operation, said drum having an element thereon for actuating said locking pin of said reciprocal locking mechanism to extend into and retract from said aligned aperture in said storage magazine as said drum rotates through one cycle of operation of said dispensing mechanism.

8. The vending machine of claim 6 wherein said coin-operated dispensing mechanism includes said rotable drum disposed in said interior chamber of said base housing below said top platform and having an outer cylindrical surface and a recess defined in said outer surface adapted to receive the one lowermost package through said radial opening of said top platform during rotation of said drum in a predetermined direction through a single dispensing cycle in which said recess, initially empty, is moved from an initial three o'clock position to an intermediate twelve o'clock position where said recess receives the one package, and finally back to said initial three o'clock position, where the package will then drop away from said recess of said drum to a discharge station of said machine, said drum having an element thereon for actuating said locking pin of said reciprocal locking mechanism to extend into and retract from said aligned aperture in said storage magazine as said drum rotates through one cycle of operation of said dispensing mechanism.

9. The vending machine of claim 5 wherein said storage magazine includes:

an outer wall of generally annular configuration;

an inner wall of generally annular configuration disposed within and spaced from said outer wall; and a plurality of partitions disposed between and rigidly attached to the outer and inner walls and extending generally radially outward with respect to a central longitudinal axis of said storage magazine such that said partitions are circumferentially spaced apart from one another so as to form with said outer and inner walls a plurality of said elongated vertical cavities open at said upper and lower ends and being spaced apart from one another and arranged in an annular row circumferentially extending around, above and adjacent to an outer portion of said top platform.

10. The vending machine of claim 5 further comprising:

a plurality of seats recessed in a top surface of said top platform at respective locations radially spaced outwardly from and circumferentially spaced about said central opening in said top platform; and a set of ball bearings each disposed in one of said seats recessed in said top platform so as to rotatably support said storage magazine relative to said top platform.

11. The vending machine of claim 5 wherein said coupling subassembly includes:

elongated hollow rigid tube extending centrally through said storage magazine and supported at a lower end by a bottom portion of said storage magazine and engaged at an upper end with said top cover;

a bearing support bracket supported by said top platform below said central opening therein;

a bottom bearing ring disposed below said central opening of said top platform and having a first bearing component fixedly mounted to said bearing support bracket and a second bearing component rotatably coupled to said first bearing component;

an elongated rigid rod extending through said rigid tube and said bearing support bracket between and attached at opposite upper and lower ends of said rigid rod respectively to said top cover and said second bearing component; and a key-operated lock device capable of being releasably tightened onto from said upper end of said rigid rod so as to releasably clamp said rigid tube between said top cover and said storage magazine such that said top cover, said storage magazine and said lower bearing component function as a single unit rotatably mounted upon said top platform for undergoing rotation relative to said top platform and said base housing by a user manually gripping opposite sides of said outer enclosure and turning said outer enclosure in a predetermined angular direction.

12. The vending machine of claim 11 further comprising:

a plurality of seats recessed in a top surface of said top platform at respective locations radially spaced outwardly from and circumferentially spaced about said central opening in said top platform; and a set of ball bearings each disposed in one of said seats recessed in said top platform so as to rotatably support said storage magazine relative to said top platform.

* * * * *